Dec. 15, 1964    R. G. LE TOURNEAU    3,161,437
OPERATING MECHANISM FOR DUMP VEHICLE
Filed Jan. 8, 1963

INVENTOR.
Robert G. LeTourneau
BY Wm. T. Wofford
Attorney

United States Patent Office 3,161,437
Patented Dec. 15, 1964

3,161,437
OPERATING MECHANISM FOR DUMP VEHICLE
Robert G. LeTourneau, P.O. Box 2307, Longview, Tex.
Filed Jan. 8, 1963, Ser. No. 250,106
2 Claims. (Cl. 298—19)

My invention relates to improvements in an operating mechanism for dump vehicles, and more particularly to operating mechanisms for such vehicles wherein variable mechanical advantage is desirable.

The mechanism with which the present invention is concerned involves pivoting movement of a structure under load from a first position to a second position, with the load decreasing as the movement progresses. An important application for such mechanism is in a load dumping vehicle, for example an earth hauling vehicle of the rear dump type. In such application, the force required to move the load is initially quite large, but decreases as the dump body is raised toward the dumping position. Numerous arrangements for such devices have been proposed in the prior art of which I am aware, but none have proven to be entirely satisfactory.

Accordingly, it is the general object of my invention to provide an improved operating mechanism for dump vehicles of the above-mentioned type.

Another object of my invention is to provide simple and effective vehicle dumping mechanism in an application wherein variable mechanical advantage is desired.

Another object of my invention is to provide improved vehicle dumping mechanism having minimal power requirements.

Another object of my invention is to provide improved vehicle dumping mechanism wherein the rate of dump body pivoting movement is correlated in an advantageous predetermined manner with the dump body angular position.

Another object of my invention is to provide an improved vehicle dumping mechanism with minimal space requirements.

These and other objects are effected by my invention as will be apparent from the following description taken in accordance with the accompanying drawing, forming a part of this application, in which.

Figure 1:
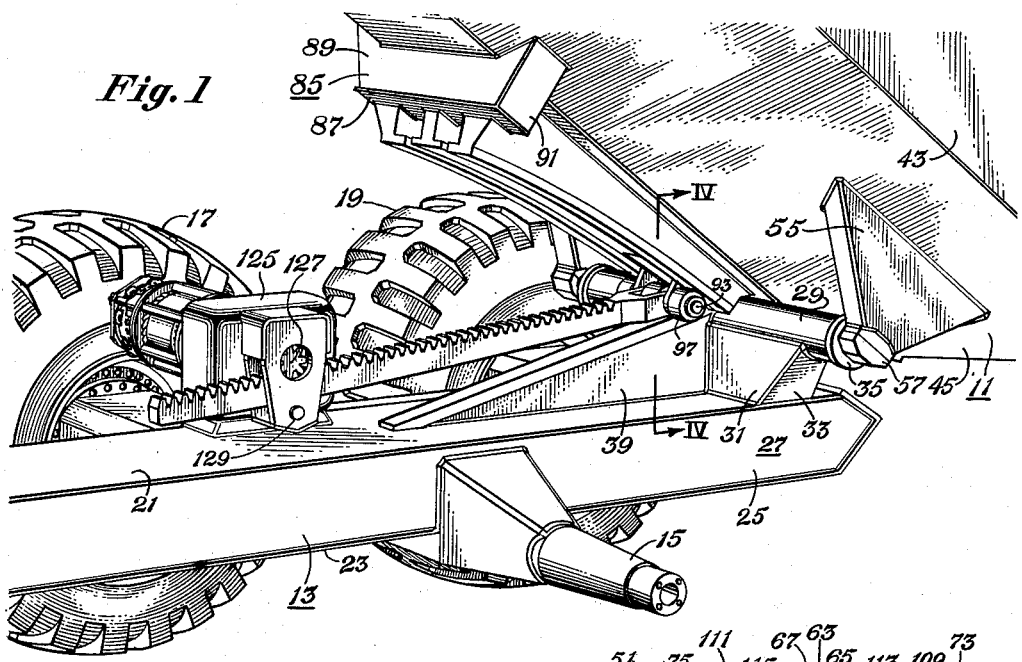
FIG. 1 is a schematic perspective view of the left side of the rear portion of a rear-dump vehicle employing a dumping mechanism in accordance with a preferred embodiment of my invention.

Referring to the drawing, FIG. 1 illustrates the left side rear portion of a vehicle having a materials-carrying pivotable rear-dump body 11 (see FIG. 2), which is supported on a main frame 13.

For convenient reference herein, the right end of the vehicle, as viewed in FIG. 1, is the rear end; the far side is the right side; and the near side is the left side. The main frame 13 is supported by a conventional bogey axle 15 fixed to the frame 13, and electric-motor-driven wheels 17, 19 (shown only on the right side) mounted on the axle 15. The main frame 13 has the form of a rectangular box-beam having top and bottom spaced parallel plates 21, 23 and intermediate parallel spaced side plates 25. Near the rear end of the frame 13, there is a pivot support structure 27 which is fixed to the top plate 21. The pivot support structure 27 includes a tubular member 29 which extends transversely of the frame 13 and which is fixed rigidly thereto by transverse plates 31 and end plates 33. To each end of the tubular member 29 there is fixed a ball portion 35 of a ball and socket arrangement. A rectangular bar 37 extends forwardly and downwardly from the mid-length point of the tubular member to merge with the top plate 21. The bar 37 is supported by a pair of triangular plates 39, 41 (see FIG. 4) which are also fixed to the top plate 21 and to the support structure 27.

Figure 2:
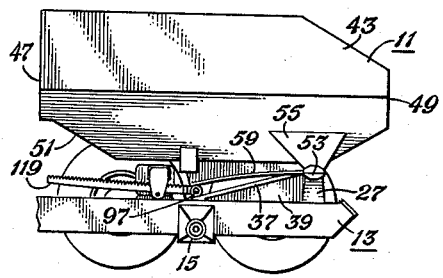
FIG. 2 is a schematic left-side elevational view of the vehicle of FIG. 1 showing the pivotable dump-body thereof in one operative position.

The dump-body 11 includes a pair of vertical side plates 43, a pair of downwardly and inwardly sloping side plates 45 and end plates, 47, 49 at the front and rear ends respectively. The body 11 also has a bottom plate 51 which connects the lower edges of the plates 45 and which slopes upwardly at the front and rear ends to connect the lower edges of the end plates 47, 49 respectively. The body 11 is pivotally supported near the rear end by a pair of socket portions 53, which mate with the upper half of the ball portions 35. The socket portions 53 are each fixed to the lower end of a depending plate structure 55 which is rigidly fixed to the sloping side plates 45, as shown in FIG. 2. A suitable socket cap portion 57 mates with the lower half of the ball portions 35 and is secured to the socket portion 53 by appropriate fasteners (not shown), thus completing the ball and socket arrangement.

Figure 4:
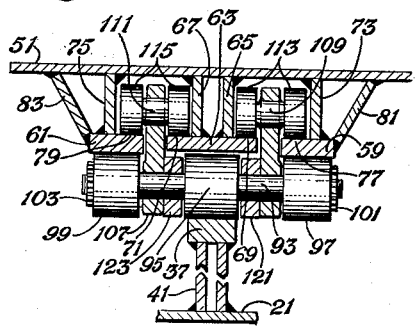
FIG. 4 is a sectional view taken at line IV—IV of FIG. 1.

Three arcuate plates 59, 61, 63 extend longitudinally of the body and beneath the bottom plate 51, as shown in FIG. 1. The plates 59, 61 are juxtaposed one on each side of and in uniform spaced relation with respect to the plate 63. The plate 63 is fixed to and disposed transversely of the lower edges of a pair of vertical plates 65, 67 which are also fixed to the bottom plate 51. The plate 63 curves away from the plane of the bottom plate 51, it being nearest thereto adjacent the tubular member 29 and farthest therefrom at the front end. The arcuate plate 63 extends laterally from the sides of the vertical plates 65, 67, as shown in FIG. 4, thereby forming a pair of shoulders 69, 71. The plates 59, 61 are fixed to and disposed transversely of the lower edges of a pair of spaced vertical plates 73, 75 respectively. The plates 73, 75 are disposed laterally of the longitudinal central axis of the plates 59, 61, thus forming another pair of shoulders 77, 79. The shoulders 77, 79 are of substantially the same width and at substantially the same level as the shoulders 69, 71. A sloping plate 81, 83 connects the outer edge respectively of the plates 59, 61 and the bottom plate 51. The front end of the structure which supports the arcuate plates 59, 61, 63 is rigidly fixed with respect to the bottom plate 51 by a transversely disposed plate structure 85. This structure 85 includes a lateral plate 87 disposed substantially parallel to the bottom plate 51 and fixed thereto by side and end plates 89 and 91 respectively. The structure 85 provides lateral support to the vertical plates 65, 67 and 73, 75 respectively.

The pivoting movement of the dump-body 11 is controlled by a system of rollers actuated by a powered rack and pinion mechanism. A shaft 93 is disposed transversely of the main frame 13 and has integrally fixed thereto, at its mid-length point, a roller 95. The roller 95 bears against the top surface of the bar 37 and is substantially the width of the bar 37. A pair of other rollers 97, 99 are journaled on the extremities of the shaft 93 so that they bear against the lower surface of the plates 59, 61 respectively. The plates 59, 61 are slightly thicker than the plate 63 so that the roller 95 does not contact the lower surface of the plate 63, as shown in FIG. 4. The rollers 97, 99 are secured to the ends of the shaft 93 by a suitable fastener such as a nut 101, 103. A pair of plates 105, 107 fit loosely on the shaft 93 and extend upward and they are freely movable between the edges of the plates 59, 63 and 61, 63 respectively. The upper end of each plate 105, 107 has a hole therein to freely receive a transverse shaft 109, 111. The ends of the shafts 109, 111 support pairs of rollers 113 and 115 respectively, which bear against the shoulders 69, 77 and 71, 79. A clevis 117 is fixed to one end of a length of rack 119. The tines 121, 123 of the clevis straddle the center roller 95 and are journaled on the shaft 93 between the roller 95 and the plates 105, 107, as shown in FIG. 4. A powered gear reduction 125 is fixed to the top plate 21 and has an output pinion 127 which engages the rack 119. A back-up roller is journaled on a shaft 129 and engages the back of the rack 119 to maintain it in continuous engagement with the pinion 127.

Figure 3:
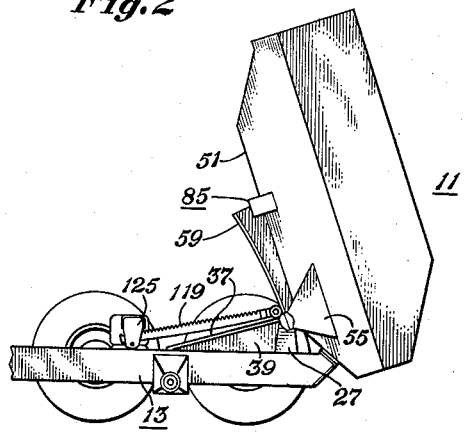
FIG. 3 is a schematic left-side elevational view of the vehicle of FIG. 1 showing the pivotable dump-body thereof in another operative position.

To describe the manner of operation of the dump mechanism, reference is made initially to FIGS. 2 and 3. When the dump-body 11 is in the operative position of FIG. 2, the rack 119 extends frontward and the rollers 97, 99 are at the front end of the plates 59, 61 and the roller 95 is at the front or lower end of the bar or rail 37. Now, in order to pivot the dump body 11 about the axis of the ball and socket joints 35, it is only necessary to actuate the gear reduction 125 and the output pinion 127 urges the rack 119 and clevis 117 toward the rear. The clevis 117 exerts a force on the shaft 93 which causes the rollers 95, 97, 99 to move rearwardly with respect to the bar 37 and the plates 59, 61 respectively. The rollers 97, 99 bear against the plates 59, 61 respectively and exert an upward force on them. Likewise, the center roller 95 bears against the rail 37 and exerts a downward force against it. The rail 37 may be considered fixed and the plates 59, 61 movable relative thereto; and so, the net resultant moving force is directed upward against the plates 59, 61. This force produces a couple acting on the dump-body and causes it to pivot about the axis of the ball joints 35. The surfaces of the plates 59, 61, 63 are curved in such a manner that the distance between the surfaces of the plates 59, 61 and the surface of the bar 37 at their front end portions decreases only slightly in the rearward direction. Consequently, the initial force couple causing pivoting movement of the body 11 is quite large, while the pivoting movement is slow. However, as the rollers 95, 97, 99 are moved rearwardly, this force couple decreases and the speed of the pivoting movement increases. It will be apparent that the body 11 attains a maximum rate of pivoting as the rollers 95, 97, 99 approach the rearward limit of their travel. As the pivoting movement progresses, the material carried in the body gravitates rearwardly and dumps therefrom. It will be understood of course that as the weight of the body load shifts rearwardly, the magnitude of the force couples required for pivoting the body decrease.

When the dump-body 11 reaches the operative position of FIG. 3, it is empty and is ready to pivot to its initial position. To accomplish this it is only necessary to actuate the gear reduction 125 and pinion 127 to move the rack 119 and clevis 117 frontwards. A tensile force exerted by the clevis urges the rollers 113, 115 into contact with the respective shoulders 69, 77 and 71, 79. The rollers 113, 115 exert a force on the dump-body 11 which will cause it to start to pivot to its initial position. As soon as pivoting commences however, the weight of the dump-body 11 will be supported by the rollers 97, 99 and by the central roller 95. It is clear, then, that the movement of the pivotable device may be carefully controlled by the gear reduction and the rack and pinion.

It should be apparent from the foregoing that my invention provides an improved simple and effective vehicle dumping mechanism wherein the power and space requirements are minimal. Further, the mechanism of my invention provides effectively applicable variable mechanical advantage wherein the rate of vehicle dump body pivoting movement varies in an orderly manner and in general inverse accordance with the magnitude of the force couples required for pivoting movement of the dump body from the loaded to the dumped position.

While I have shown my invention in only one form it will be obvious to those skilled in the art that it is not so limited, but is susceptible of various changes and modifications without departing from the spirit thereof.

I claim:

1. In a dump vehicle having a dump body and a chassis, with said body being fixed to said chassis so as to be pivotable about an axis from a load carrying to a dumping position, a dump operating mechanism comprising: a plurality of spaced juxtaposed plates fixed to the underside of said dump body and extending transversely and forwardly of said pivot axis with one end of each said plate disposed adjacent said pivot axis and with each said plate having substantially parallel top and bottom roller engaging arcuate surfaces; support means fixed to said chassis and having a planar roller engaging surface facing said arcuate surfaces and having one end disposed adjacent said axis; first roller means engaging said bottom arcuate surfaces; second roller means engaging said planar surface; means linking said first and second roller means in mutual substantially fixed spaced relation; third roller means engaging said top arcuate surfaces; means linking said third roller means to said first and second roller means; a rack fixed adjacent one end to said roller means and extending forwardly therefrom; and an electric motor driven gear reduction fixed to said chassis and having an output pinion drivingly engaging said rack; the curvature of said bottom arcuate surfaces relative to said planar surface being such that the rate of dump body pivoting movement will vary in general inverse accordance with the magnitude of the force couples required for pivoting movement of said body from the load carrying to the dumping position.

2. In a dump vehicle having a dump body and a chassis, with said body being fixed to said chassis so as to be pivotable about an axis from a load carrying to a dumping position, a dump operating mechanism comprising: a plurality of spaced juxtaposed plates fixed to the underside of said dump body and extending transversely and forwardly of said pivot axis with one end of each said plate disposed adjacent said pivot axis and with each said plate having substantially parallel top and bottom roller engaging arcuate surfaces; support means fixed to said chassis and having a planar roller engaging surface facing said arcuate surfaces and having one end disposed adjacent said axis; first roller means engaging said bottom arcuate surfaces; second roller means engaging said planar surface; means linking said first and second roller means in mutual substantially fixed spaced relation; third roller means engaging said top arcuate surfaces; means linking said third roller means to said first and second roller means; and means for applying force to urge said rollers in the direction toward said axis; the curvature of said bottom arcuate surfaces relative to said planar surface being such that the rate of dump body pivoting movement will vary in general inverse accordance with the magnitude of the force couples required for pivoting movement of said body from the load carrying to the dumping position.

References Cited in the file of this patent

UNITED STATES PATENTS 1,770,086    Phaneuf _____ July 8, 1930

FOREIGN PATENTS 111,897    Australia _____ Nov. 7, 1940
122,256    Australia _____ Sept. 11 1946
893,614    Germany _____ Oct. 19, 1953